(12) United States Patent
Parkar et al.

(10) Patent No.: US 11,911,236 B2
(45) Date of Patent: Feb. 27, 2024

(54) WATER-RESISTANT POLYMER-BASED DENTAL ARTICLES

(71) Applicant: 3M INNOVATIVE PROPERTIES COMPANY, St. Paul, MN (US)

(72) Inventors: Zeba Parkar, Marietta, GA (US); Richard E. Raby, Lino Lakes, MN (US); James D. Hansen, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 756 days.

(21) Appl. No.: 16/632,463

(22) PCT Filed: Jul. 24, 2018

(86) PCT No.: PCT/US2018/043380
§ 371 (c)(1),
(2) Date: Jan. 20, 2020

(87) PCT Pub. No.: WO2019/023166
PCT Pub. Date: Jan. 31, 2019

(65) Prior Publication Data
US 2021/0153978 A1 May 27, 2021

Related U.S. Application Data

(60) Provisional application No. 62/536,719, filed on Jul. 25, 2017.

(51) Int. Cl.
*A61C 7/08* (2006.01)
*B33Y 80/00* (2015.01)
(Continued)

(52) U.S. Cl.
CPC ............... *A61C 7/08* (2013.01); *B29C 51/14* (2013.01); *B29C 51/266* (2013.01); *B33Y 80/00* (2014.12);
(Continued)

(58) Field of Classification Search
CPC .............. C09D 165/04; B32B 2255/26; B32B 2386/00; C08G 61/025; C08L 65/04
See application file for complete search history.

(56) References Cited

U.S. PATENT DOCUMENTS

| 5,174,295 A | 12/1992 | Christian et al. |
| 5,380,320 A | 1/1995 | Morris |

(Continued)

FOREIGN PATENT DOCUMENTS

| CN | 106796381 A | 5/2017 |
| KR | 101327313 | 11/2013 |

(Continued)

OTHER PUBLICATIONS

Motevasselian et al., "The Effect of Parylene-C Coating on the Surface Free Energy, Water Sorption, Solubility and Staining of PMMA," 2014, *Journal Chem Applications*, 1(1):7.

(Continued)

*Primary Examiner* — Kregg T Brooks
(74) *Attorney, Agent, or Firm* — Ashley M. Dreis

(57) ABSTRACT

A dental article such as a dental tray aligner or a dental crown that includes a substrate including a polymeric material having a modulus of elasticity that reduces upon exposure to water and a water-resistant coating on the substrate, where the water-resistant coating comprises parylene. In some examples, the water-resistant coating may include one or more layers that include parylene.

17 Claims, 8 Drawing Sheets

(51) Int. Cl.
  *B29C 51/14* (2006.01)
  *B29C 51/26* (2006.01)
  *C09D 165/04* (2006.01)
  *B29K 33/00* (2006.01)
  *B29L 31/00* (2006.01)

(52) U.S. Cl.
  CPC ........ *C09D 165/04* (2013.01); *A61C 2201/00* (2013.01); *B29K 2033/12* (2013.01); *B29L 2031/753* (2013.01); *B32B 2386/00* (2013.01)

(56) References Cited

U.S. PATENT DOCUMENTS

| | | | |
|---|---|---|---|
| 6,353,041 | B1 | 3/2002 | Qian |
| 8,329,776 | B2 | 12/2012 | Hecht |
| 8,778,444 | B2 | 7/2014 | Kim |
| 2006/0199153 | A1 | 9/2006 | Liu |
| 2006/0265049 | A1 | 11/2006 | Gray et al. |
| 2007/0054127 | A1* | 3/2007 | Hergenrother .......... C23C 26/00 428/521 |
| 2009/0148813 | A1 | 6/2009 | Sun |
| 2011/0053116 | A1 | 3/2011 | Hecht |
| 2011/0171606 | A1 | 7/2011 | Lewis et al. |
| 2011/0220612 | A1 | 9/2011 | Kim |
| 2011/0244424 | A1 | 10/2011 | Mehrhof |
| 2012/0288824 | A1* | 11/2012 | Nordin ................. A61C 8/0069 433/173 |
| 2015/0111176 | A1* | 4/2015 | Wachter ................ G03F 7/0037 430/269 |
| 2015/0132583 | A1 | 5/2015 | Pokorny |
| 2016/0256243 | A1 | 9/2016 | Kim |
| 2017/0245962 | A1 | 8/2017 | Skamser et al. |
| 2019/0125574 | A1* | 5/2019 | Ignacio ................... A61F 5/566 |

FOREIGN PATENT DOCUMENTS

| | | |
|---|---|---|
| WO | WO 1994-021214 | 9/1994 |
| WO | WO 2007/013116 A1 | 2/2007 |
| WO | WO 2008-088146 | 7/2008 |
| WO | WO 2014-175494 | 10/2014 |
| WO | WO 2015/059257 A1 | 4/2015 |
| WO | WO 2017/165918 A1 | 10/2017 |
| WO | WO 2019-023009 | 1/2019 |
| WO | WO 2019-239286 | 12/2019 |

OTHER PUBLICATIONS

Bourlidi, "Effect of Different Initial Finishes and Parylene Coating Thickness on the Surface Properties of Coated PMMA", Journal of Prosthetic Dentistry, 2015, vol. 115, No. 3, pp. 363-370.

Elias, "Influence of The Coating Material on the Loosing of Dental Implant Abutment Screw Joints", Materials Science and Engineering C, 2006, vol. 26, No. 08, pp. 1361-1366.

Koydemir, "Solvent Compatibility of Parylene C Film Layer", Journal of Microelectromechanical Systems, 2014, vol. 23, No. 02, pp. 298-307.

"Parylene Coating", Parylene Engineering [retrieved from the internet on Mar. 20, 2020], URL <http://www.paryleneengineering.com/>, 2020, pp. 1-3.

Santos, "The Effect of Parylene Coating on the Surface Roughness of PMMA after Brushing", Journal of Dentistry, 2013, vol. 41, No. 09, pp. 802-808.

Teixeira, "Zirconia-Parylene Multilayer Thin Films for Enhanced Fracture Resistance of Dental Ceramics", Proceedings of the Institution of Mechanical Engineers, 2009, vol. 223, No. 07, pp. 897-902.

Xie, "Long-term Bilayer Encapsulation Performance of Atomic Layer Deposited $Al_2O_3$ and Parylene C for Biomedical Implantable Devices", IEEE Transactions on Biomedical Engineering, 2013, vol. 60, No. 10, pp. 2943-2951.

Zufall, "Sliding Mechanics of Coated Composite Wires and the Development of an Engineering Model for Binding", Angle Orthodontist, 2000, vol. 70, No. 01, pp. 34-47.

International Search Report for PCT International Application No. PCT/US2018/043380, dated Jan. 16, 2019, 3 pages.

ISO 22196:2011, "Measurement of antibacterial activity on plastics and other non-porous surfaces." Abstract. https://www.iso.org/standard/54431.html.

* cited by examiner

WATER-RESISTANT POLYMER-BASED DENTAL ARTICLES

CROSS REFERENCE TO RELATED APPLICATIONS

This application is a national stage filing under 35 U.S.C. 371 of PCT/US2018/043380, filed Jul. 24, 2018, which claims the benefit of Provisional Application No.62/536,719, filed Jul. 25, 2017, the disclosures of each of which are incorporated by reference herein in their entireties.

TECHNICAL FIELD

The present disclosure relates to polymer-based dental articles such as teeth aligners.

BACKGROUND

The field of orthodontics relates to the supervision, guidance and correction of teeth towards proper positions in the oral cavity. Various orthodontic devices and treatment methods have been developed to address dental alignment issues. Traditional approaches generally involve the application of forces to move teeth into a proper bite configuration, or occlusion. One mode of therapy includes the use of fixed appliances attached to the teeth of a patient and, using an archwire, applying gentle, therapeutic forces to move the teeth from improper positions to proper positions. Such dental appliances remain in the mouth of the patient and are periodically adjusted by an orthodontist to check the process and maintain the proper pressure against the teeth until proper alignment is achieved.

Dental aligners and other dental articles have been produced using polymer-based components. In some such examples, the polymer-based components may be relatively clear or transparent to provide a less conspicuous appearance than a metal, ceramic, or similar type of device.

SUMMARY

In some examples, the disclosure describes a dental article including a substrate including a polymeric material, where a modulus of elasticity of the substrate is reduced upon exposure to water, and a water-resistant coating on the substrate, where the water-resistant coating includes parylene.

In some examples, the disclosure describes a dental article including a three-dimensionally printed polymeric substrate, and a water-resistant coating applied over the substrate, where the water-resistant coating includes a parylene layer.

In some examples, the disclosure describes a method including forming a substrate for a dental article, where a modulus of elasticity of the substrate is reduced upon exposure to water, and coating the substrate with a water-resistant coating including parylene.

In some examples, the disclosure describes a method including forming a model of the dental anatomy of a patient, applying a first coating including parylene on the model, thermoforming a sheet of polymeric material over the first coating, trimming the sheet of polymeric material to form a polymer-based substrate, applying a second coating including parylene on exposed surfaces of the polymer-based substrate, trimming the second coating to define a dental article, the dental article including the polymer-based substrate, the first coating, and the second coating, and separating the dental article from the model.

The details of one or more examples are set forth in the accompanying drawings and the description below. Other features, objects, and advantages will be apparent from the description and drawings, and from the claims.

DETAILED DESCRIPTION

Figure 1:
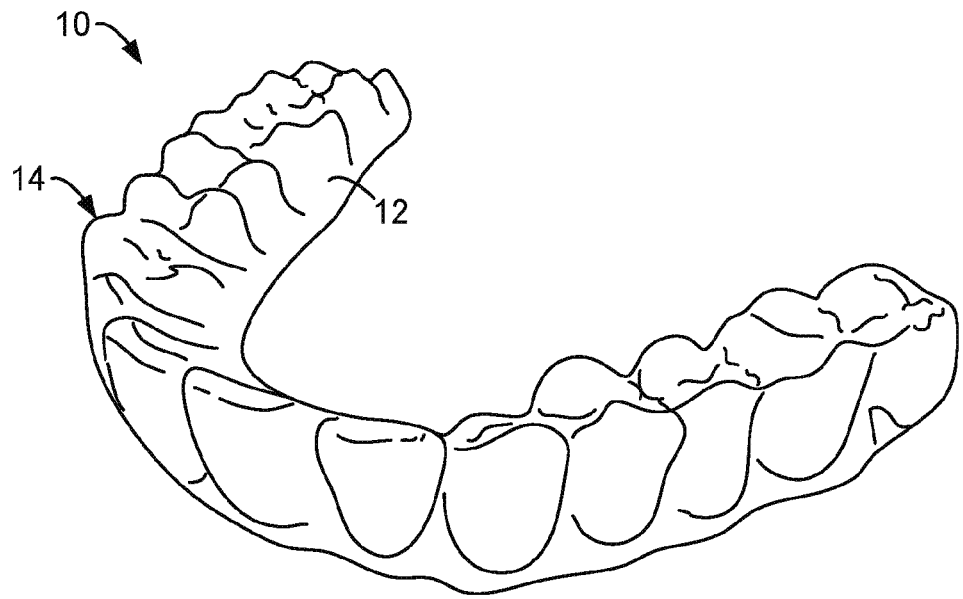
FIG. 1 is a perspective view of an example dental article that includes a polymer-based substrate and a water-resistant coating that includes parylene.

The disclosure describes dental articles that include a polymer-based substrate and a water-resistant coating including parylene, and methods for making the same. Such dental devices may include for example, dental tray aligners, dental crowns, night guards, retainers, implants, dentures, partials, temporary replacements, elastic bands, springs, spring aligners, polymeric archwires and arch members, custom force members, attachments, brackets and other bonded appliances, trays for delivering therapeutic agents, or the like. The description primarily focuses on and describes dental tray aligners; however, many dental articles may be constructed using the components and techniques described herein. The disclosure is not intended to be limited to specific types of dental articles by focusing on the details of dental tray aligners.

The dental articles described herein may include polymer-based substrates and a water-resistant coating that includes parylene over the substrate. In some examples, the polymeric materials used to form the substrate for such dental articles may exhibit several useful qualities such as moldability, printability, stiffness, strength, durability, aesthetically pleasing color or transparency, tactilely pleasing texture, or the like. However, some polymer materials used in such devices experience softening or degradation of mechanical properties, such as a reduction in the modulus of elasticity of the substrate, in the presence of water over time. For example, some polymeric materials may possess relatively high modulus of elasticity due in part to hydrogen bonding between polymer chains. Exposure to water may reduce or eliminate hydrogen bonding, which may reduce the modulus of elasticity of the polymeric material. The reduction causes the substrate to soften, which may make the polymer-based substrate less suitable for certain types of devices including, for example, dental tray aligners or other dental articles used to apply or maintain a force against the teeth of a patient. For example, dental tray aligners can be used for applying a mechanical force to teeth of a patient to move the teeth into a new alignment. To move the teeth, the dental aligner must apply a therapeutic force to the teeth above a threshold value needed to stimulate bone remodeling and corresponding movement of the teeth. The reduced modulus of elasticity or recovery force upon exposure to water may inhibit the ability of the dental tray aligner to apply or maintain such a therapeutic force, thereby rendering the dental tray aligner ineffective, or at least somewhat degraded in its ability to express prescribed movements of the teeth.

Coating such polymer-based substrates with a water-resistant coating that includes parylene may significantly reduce the detrimental effects caused by exposing the polymer-based substrate to water, as well as impart other useful benefits to the dental device. In some examples, the water-resistant coating may include a layer that includes parylene. The layer that includes parylene may be applied using a chemical vapor deposition process. The vapor deposition process may result in a layer that has relatively high density (low porosity), which may contribute to the water-resistance of the coating. Additionally, or alternatively, the vapor deposition process may result in a layer that substantially conforms to a geometry of the substrate. For example, the layer may have a substantially consistent thickness. This may facilitate coating the polymer-based substrate while also achieving a targeted geometry for the dental article, which may be important for dental devices such as dental tray aligners or the like, where precision fit may be important to achieve desired results using the device.

FIG. 1 is perspective view of an example dental article 10 that includes a polymer-based substrate 12 and a water-resistant coating 14 that includes parylene over polymer-based substrate 12. In the example of FIG. 1, dental article 10 includes a dental tray aligner. However, dental article 10 need not be limited to a dental tray aligner. In other examples, dental article 10 may include other polymer-based devices used in dental procedures including, but not limited to, dental crowns, night guards, retainers, implants, dentures, partials, temporary replacements, elastic bands, springs, spring aligners, polymeric archwires and arch members, custom force members, attachments, brackets and other bonded appliances, trays for delivering therapeutic agents, or the like.

In some examples, polymer-based substrate 12 may include a biocompatible polymeric material. Depending on the particular application for dental article 10, in some implementations, polymer-based substrate 12 may have a modulus of elasticity of greater than about 100 MPa, such as between about 300 MPa and about 5 GPa. However, as described above, the modulus of elasticity of such polymers may decrease upon exposure to water. In addition, water exposure may cause a deformed polymer to stress relax, thereby reducing the restoring force applied to the teeth. In some examples, the relatively high modulus of elasticity of polymer-based substrate 12 may permit dental article 10 to exhibit a sufficient stiffness even where polymer-based substrate 12 is relatively thin. For example, when dental article 10 is a dental tray aligner, the stiffness of polymer-based substrate 12 may permit the aligner to apply a therapeutic force to actively stress the teeth of a patient and guide the teeth into a new alignment. To cause the teeth to move, the therapeutic force generally must be above a threshold value. This threshold may be somewhat generalized to suit a population of typical patients, or it may be tailored to the individual patient as a function of several factors, including systolic blood pressure, bone density, immune system health, use of anti-inflammatory drugs, etc. Absent the threshold force, the teeth will maintain their original positions, or at least partially return to their previous positions once the dental tray aligner is removed. Hence, in some examples, by formulating polymer-based substrate 12 to possess and maintain a modulus of elasticity greater than about 300 MPa, polymer-based substrate 12 can apply the desired therapeutic force to the teeth even when the thickness of such an article remains relatively thin (e.g., on the order of about 300 micrometers ($\mu m$) to about 1000 $\mu m$).

Additionally, or alternatively, by formulating polymer-based substrate 12 to define a modulus of elasticity less than about 5 GPa polymer-based substrate 12 may still remain somewhat flexible to permit dental device 10 to have some degree of flexibility where needed. In the example of a dental tray aligner, the flexibility of polymer-based substrate 12 may permit dental article 10 to be advanced over the contours of the teeth of a patient to allow for insertion and/or removal of dental article 10 when desired. In some examples, the modulus of elasticity of a material may be measured according to ASTM D638.

In some examples, polymer-based substrate 12 may include a (meth)acrylate polymer, epoxy, silicones, polyesters, polyurethanes, thiol-ene polymers, or the like. Suitable acrylate polymers may include urethane (meth)acrylate polymers, polyalkylene oxide di(meth)acrylate, alkane diol di(meth)acrylate, aliphatic (meth)acrylates, silicone (meth) acrylate, and the like. In some examples, polymer-based substrate 12 may include urethane (meth)acrylate polymers comprising of alkyl, polyalkylene, polyalkylene oxide, aryl, polycarbonate, polyester, polyamide and combinations thereof. Example urethane (meth)acrylate polymers suitable for use as polymer-based substrate 12 are described in co-pending in U.S. Provisional Patent Application Ser. No. 62/536,568, by Parkar et al., titled Photopolymerizable Compositions Including a Urethane Oligomer and a Reactive Diluent, Articles, and Methods, the contents of which are incorporated by reference in its entirety. Such urethane (meth)acrylate polymers may be particularly useful due to their mechanical properties at body temperature or three-dimensional printing capabilities. However, urethane (meth) acrylate polymers are hydrophilic, and mechanical properties of urethane (meth)acrylate polymers may degrade in water-rich environments such as inside the mouth of a patient. For example, exposure to water may result in reduction of a modulus of elasticity or stress relaxation of urethane (meth)acrylate polymers, e.g., due to a loss in secondary interactions like hydrogen bonding. As such, dental article 10 may not function properly over time in applications in which dental article 10 is used to apply a force to the teeth of a patient. In such examples, the application of water-resistant coating 14 with parylene, may significantly reduce or prevent the hydrolytic degradation of the urethane (meth)acrylate substrate.

In some examples, polymer-based substrate 12 may include polyethylene terephthalate based polymers such as polyethylene terephthalate glycol (PETG). PETG is a thermoplastic polymer that exhibits a sufficient modulus of elasticity at room temperature (e.g., about 1.95 GPa). PETG may have a high-tensile strength, high-impact strength, high flexural strength, good thermoformability, and good printability.

Polymer-based substrate 12 may be formed into a desired shape using any suitable technique. In some examples, polymer-based substrate 12 may be formed into the shape of the teeth of a patient using a thermoforming mold process. For example, a mold plug or positive model of at least a portion of the patient's dental anatomy may be formed using suitable techniques, such as by 3D printing, milling, pouring a casting of an impression, or setting segmented teeth in wax. A sheet of the material used to form polymer-based substrate 12 may be heated to its glass transition temperature, draped over the dental model, and subjected to an air pressure differential, such that a higher pressure is applied to the outer surface of the sheet than the inner surface adjacent to the model. Note that this differential is referred to as "vacuum" if the pressure adjacent the model is below ambient air pressure, and as "positive pressure" if the pressure applied to the outer surface is above ambient air pressure. The pressure differential causes the sheet to conform to the surface of the dental model, and the shape is retained by maintaining the pressure differential until the sheet cools below its glass transition temperature.

In other examples, three-dimensional printing or additive manufacturing may be used to form polymer-based substrate 12. For example, a digital three-dimensional representation of the teeth of a patient may be produced using, for example, an intraoral scanner. Polymer-based substrate 12 then may be directly produced based on the digital representation of the teeth using a three-dimensional printer.

However, as discussed above, some polymers used to form polymer-based substrate 12 may be suitable for three-dimensional additive manufacturing, but may absorb water or be softened in the presence of water, which may cause such polymers to be less suitable for certain types of dental applications (e.g., dental tray aligners). Further, the three-dimensional printing process adds material to a component on a layer-by-layer or volume-by-volume basis. Such construction techniques may produce a textured surface marked by contour lines or "stair steps" (also known as aliasing effects), which may be less desirable in oral applications due to poor sensory feel. Additionally, polymer-based substrates, particularly clear polymers, formed using a three-dimensional printing device may scatter light due to the stepped or textured structure resulting from the layer-by-layer or volume-by-volume build process. This leads to a reduction in the optical clarity of polymer-based substrate 12. In applications where aesthetics and clarity are important, such as in dental tray aligners, such imperfections associated with three-dimensional printing make such construction techniques less desirable due to poor visual and tactile properties.

Other undesirable effects stemming from aliasing or surface roughness may include biofilm formation and increased friction or interference with opposing surfaces in the dentition. Oral biofilms include bacteria cultures that can lead to acid production, odors, and calculus build-up. The inside corners created at the boundaries of material layers during the manufacturing process can serve as refuges for bacteria cultures, protecting them from salivary flows and wiping action by the tongue and oral mucosa. In some examples, similar effects can stem from a finer level of texture created at the boundaries of light exposure during a photo-polymerization process used to form the polymer based substrate 12. Such textures may include microscopic textures (e.g., textures less than about 20 µm in size) with features on a scale much smaller than a pixel or print layer. As such, biofilm adhesion can occur over the surface of the appliance if it is not polished to a high gloss or protected with a glossy coating.

Dental article 10 may include water-resistant coating 14, which may address some or all of these undesirable effects. For example, water-resistant coating 14 may improve the stability of dental article 10 upon exposure to water. In such examples, water-resistant coating 14 may act as a barrier to water, reducing or substantially preventing the ingress of water into polymer-based substrate 12, thereby allowing polymer-based substrate 12 to substantially retain its mechanical properties in the presence of water. Further, in some examples, the barrier properties of the parylene within water-resistant coating 14 may also reduce the transmission rate of trace amounts of free monomers, initiators, or other molecules diffusing out of polymer-based substrate 12 into the oral environment.

Additionally, or alternatively, water-resistant coating 14 may improve the visual or tactile properties of dental article 10. For example, as described further below, parylene may be deposited via chemical vapor deposition using a para-xylylene gas that undergoes polymerization Due to the small size of the para-xylylene molecule and the deposition process, parylene may be deposited as a relatively dense and water-resistant layer, particularly in comparison to other polymer coatings deposited using a liquid-based coating process. In some examples, the layer that includes parylene forming water-resistant coating 14 may define a porosity of less than about 5%. Porosity is defined as a volume of pores divided by a total volume of the respective layer of water-resistant coating 14, and may be measured using optical microscopy, mercury porosimetry, or the like.

Additionally, or alternatively, the application of water-resistant coating 14 that includes parylene may reduce a roughness of the exterior surface of polymer-based substrate 12. For example, where polymer-based substrate 12 is produced using three-dimensional printing, water-resistant coating 14 may coat the surface of polymer-based substrate 12 and smooth aliasing effects or general surface textures resulting from the printing process. Additionally, or alternatively, due to process formation techniques for polymer-based substrate 12, e.g., three-dimensional printing or other techniques, polymer-based substrate 12 may define a first surface roughness. Due to the vapor deposition process of forming water-resistant coating 14 that includes parylene, the parylene may smooth the surface of polymer-based substrate 12 such that the outer surface of water-resistant coating 14 defines a second surface roughness less than that of polymer-based substrate 12. Collectively, by reducing the overall surface roughness or presence of surface textures of dental article 10, water-resistant coating 14 including parylene may likewise inhibit biofilm formation compared to an otherwise uncoated polymer-based substrate 12. Additionally, or alternatively, the reduced surface roughness attributed to the presence of water-resistant coating 14 including parylene, may also reduce the coefficient of friction for dental article 10 compared to an otherwise uncoated polymer-based substrate 12.

In some examples, water-resistant coating 14 that includes parylene may provide a glossy surface. For example, parylene may be applied using a chemical vapor deposition (CVD) process, e.g., a polymer vapor deposition (PVD) process, wherein the parylene is created directly on the surface of polymer-based substrate 12 from individual monomer molecules. These molecules are supplied in gaseous form and condense into polymers on the surface of the substrate, thereby allowing them to deposit in the smallest of microscopic cavities. As more and more molecules integrate with the surface, the coating grows thicker, eventually filling and smoothing over these microscopic cavities. In addition to bonding with the substrate, the ability of parylene to fill the microscopic cavities provides excellent mechanical interlocking. The result is a strong interface that resists delamination.

By smoothing the exterior surface of dental article 10, article 10 may possess an improved sensory feel in the mouth of a patient. Additionally, as parylene is deposited as a clear coating, in some examples in which polymer-based substrate 12 is clear, smoothing the outer surface of dental article 10 with water-resistant coating 14 may improve the clarity of the resultant article 10 and overall visual aesthetics. Additionally, a more linear path for light transmission may be established by the parylene, thereby improving the optical clarity of dental article 10. In contrast, coatings that are applied as high viscosity liquid resins and later polymerized can have the disadvantage of incomplete penetration of microscopic cavities in the surface.

Additionally, in some examples, water-resistant coating 14 that includes parylene may also be effective at reducing the adherence and/or penetration of staining agents found in the mouth such as curry, mustard, wine, coffee, and the like to provide improved visual aesthetics over the life of the device.

Water-resistant coating 14 may include a layer including parylene (e.g., Parylene-C (polychloro-p-xylylene), Parylene-D (polydichloro-p-xylylene), Parylene-F (polytetrafluoro-p-xylylene), Parylene-N(poly-p-xylylene), Parylene HT® available from Specialty Coating Systems, Indianapolis, Ind. (replaces the alpha hydrogen atom of the N dimer with fluorine), SCS microRESIST® Antimicrobial Parylene Technology available from Specialty Coating Systems, Parylene C-UVF® available from Specialty Coating Systems, Indianapolis, IN, or combinations thereof). In some examples, the layer including parylene may be deposited using a self-initiated chemical vapor deposition process with para-xylylene dimer (e.g., [2.2]paracyclophane for the production of Parylene-C) as the starting component. For example, polymer-based substrate 12 may be positioned in a vacuum deposition chamber that is evacuated to a pressure on the order of about 0.1 torr (about 13.33 Pascal) resulting in a mean free path for gas molecules in the deposition chamber on the order of 0.1 cm. Solid or gaseous para-xylylene dimer may be heated to a temperature that causes the para-xylylene dimer to decompose into a monomeric para-xylylene gas. As there are no side molecules formed in the decomposition process, the resultant monomeric para-xylylene gas will be substantially pure. The monomeric gas may be introduced to the vacuum deposition chamber containing polymer-based substrate 12. The monomeric gas then may be deposited on polymer-based substrate 12. As the mean free path of the gaseous para-xylylene monomers is on the order of 0.1 cm, the deposition process may be a non-line of sight process, and parylene may be deposited on all or nearly all surfaces of polymer-based substrate 12. Thus, in some examples, parylene may substantially encapsulate (e.g., completely encapsulate or nearly completely encapsulate) polymer-based substrate 12.

In some examples, because parylene is deposited via gas deposition as opposed to a liquid deposition process, the parylene does not pool, bridge, or exhibit meniscus properties and defects during the deposition process. As a result, the parylene may be applied to polymer-based substrate 12 as a relatively thin and substantially uniform water-resistant coating 14. For example, the thickness and uniformity of liquid-based coatings may be related to the viscosity, working temperature and humidity, and application process (e.g., spray or dip coating). In some examples, coatings applied using a liquid-based coating technique may have a thickness that varies by as much as +/−50% of the target final thickness of the liquid coating. This problem can be exacerbated when coating complex geometries such as tooth aligners which contain many areas of high and complex curvature. In contrast, the thickness of the layer including parylene deposited using the vapor deposition process may be a function of the amount of vaporized dimer and the chamber dwell time. In some examples, the thickness of the layer including parylene can be controlled to a tolerance of about +/−5% of a targeted thickness.

The improved tolerance associated with the thickness of water-resistant coating 14 may be useful for certain orthodontic applications, such as dental tray aligners, where the dental tray aligner is designed to move teeth of a patient by only fractions of a millimeter at a time. In contrast, liquid based coatings (e.g., resulting from spray or dip coating deposition techniques) may produce non-uniform thicknesses and high spots in the coating which may lead to pinch points or unintended pressure points on the teeth of a patient leading to misalignment or increased discomfort. The uniformity of water-resistant coating 14 may improve the wearability, accuracy, and effectiveness of dental article 10.

In some examples, the final thickness of water-resistant coating 14 including parylene may be at least about 5 µm, at least about 15 µm, at least about 25 µm, at least about 50 µm, at least about 100 µm, or at least about 150 µM. In some examples, the final thickness of water-resistant coating 14 including parylene may be less than about 2 mm, less than about 1 mm, less than about 250 µm, less than about 100 µm, or less than about 50 µm. However, in other examples, the thickness of water-resistant coating 14 including parylene may be greater than about 50 µm, such as, up to about 5 mm. In some examples, the final thickness of the parylene layer within water-resistant coating 14 may be greater than about 25 µm and less than about 200 µM. Having the layer of parylene be greater than at least about 25 µm may help reduce the aliasing effects described above.

In some such examples, the mechanical properties of dental article 10 with the very thick layer of parylene may be predominately attributed to the parylene coating rather than the underlying substrate. The thick layer of parylene may provide desired and stable modulus of elasticity, high fracture toughness, low creep, high transparency, high stain resistance, and the like. In some examples, water-resistant coating 14 includes a layer comprising parylene that defines a thickness greater than the thickness of polymer-based substrate 12, measured in a direction normal to the surface of polymer-based substrate 12.

Additionally, as opposed to other types of water-resistant coatings, the deposition reaction of para-xylylene to form parylene is self-initiating and self-propagating and does not require the presence of catalysts, solvents, or other foreign substances to deposit the coating. Thus, water-resistant coating 14 including a layer that includes parylene may have a high purity, resulting in fewer or substantially no unwanted processing aids (e.g., catalysts and solvents) as residual components within dental article 10. Furthermore, as the decomposition of para-xylylene dimer to para-xylylene monomeric gas is a clean reaction that does not produce any byproducts, the purity of the water-resistant coating 14 may be further controlled based on the purity of the para-xylylene dimer starting material. Parylene also has excellent biocompatibility.

In some examples, dental article 10 may further include a desiccant (e.g., a moisture getter) within or on polymer-based substrate 12. The desiccant may work in conjunction with water-resistant coating 14 to minimize the impact of water on the mechanical properties (e.g., modulus of elasticity) of polymer-based substrate 12. For example, the desiccant may help to sequester any residual moisture in polymer-based substrate 12 prior to being coated with water-resistant coating 14. Additionally, or alternatively, the desiccant may sequester any moisture that permeates through water-resistant coating 14 to prevent the moisture from degrading the mechanical properties of polymer-based substrate 12.

In some examples, the desiccant may include silica gel, sodium aluminosilicate, zeolites, hydrophilic polymers, clays, or the like. The desiccant may be added in any suitable amount so as not to significantly alter the underlying mechanical properties of polymer-based substrate 12. In some examples, a suitable amount may include about 5 percent by weight of polymer-based substrate 12.

In other examples, the desiccant may be deposited on polymer-based substrate 12 prior to applying water-resistant coating 14. In some such examples, the desiccant may be incorporated into or on polymer-based substrate 12 in select areas of dental article 10 where the mechanical properties of the device are less critical (e.g., within the palate region) and not in or on other areas of the substrate.

Figure 2:
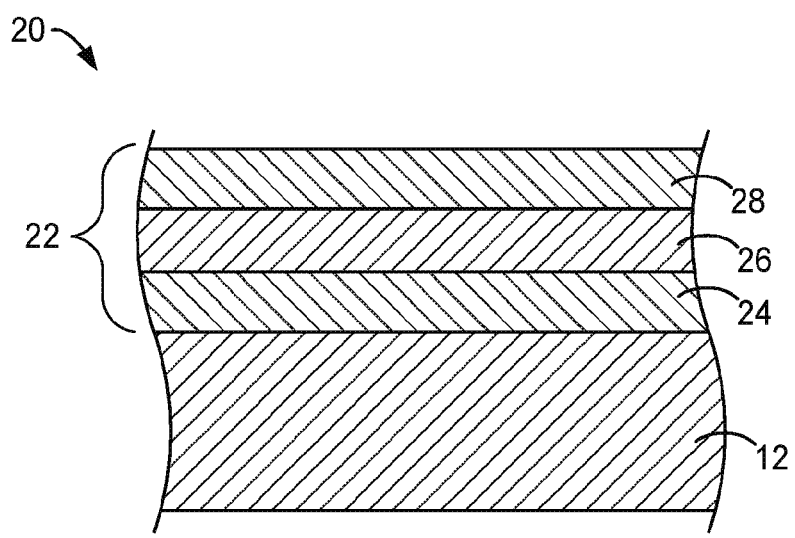
FIGS. 2-4 are cross-sectional views of example dental articles that include a polymer-based substrate with a multi-layer water-resistant coating that includes parylene.

In some examples, rather than including a single layer including parylene, water-resistant coating 14 may include a plurality of layers, including at least one layer that includes parylene. For example, FIG. 2 shows a cross-sectional view of an example dental article 20 that includes a polymer-based substrate 12 and a multi-layer water resistant coating 22. Article 20 including polymer-based substrate 12 may be substantially the same as article 10 of FIG. 1, aside from the differences described herein.

Water resistant coating 22 may include a plurality of layers, such as a first layer 24 including parylene on polymer-based substrate 12, an intermediate layer 26 on first layer 24 that includes an inorganic material or polymeric hardcoat, and an optional second layer 28 including parylene on intermediate layer 26.

First and second layers 24 and 28 may each define a layer thickness of between about 5 μm and about 50 μm, such as between about 5 μm and about 25 μm. Each of first and second layers 24 and 28 may be similar to or substantially the same as the layer including parylene described above with respect to water resistant coating 14. In some examples, first and second layers 24 and 28 may work collectively to reduce or substantially prevent the ingress of water through water resistant coating 22 and absorption of water by polymer-based substrate 12.

Intermediate layer 26 may be deposited between first and second layers 24 and 28. Intermediate layer 26 may include an inorganic material, such as a metal, a metal alloy, a metal oxide, a ceramic, a glass, or a crystalline mineral, that improves the durability and wear resistant properties of dental article 20 compared to an article that includes a water-resistant coating that includes only a layer including parylene.

For example, while first and second layers 24 and 28 may provide sufficient water barrier properties, parylene may possess relatively low wear resistance. In some such examples, a layer including parylene may become worn away by repeated contact with or rubbing against other objects, such as teeth, food, or the like. While lower wear properties may be acceptable for certain dental applications (e.g., removable dental tray aligners), such wear properties may be less acceptable for applications where the dental article is fixed or relatively permanent. Such dental applications that require increased levels of wear resistance may include dental crowns, bridges, dentures, bite splints, orthodontic brackets, or the like where dental article 20 remains fixed in the mouth of the patient and undergoes repeated contact (e.g., chewing, grinding) with teeth, food, or the like. In such applications, intermediate layer 26 may be included with dental article 20 to increase the durability and wear resistance of article 20 compared to an article with a water-resistant layer that includes only a single layer with parylene. Additionally, or alternatively, intermediate layer 26 may include materials (e.g., metal oxides) that may provide additional barrier properties (e.g., water and/or antimicrobial barrier properties) to article 20.

Example inorganic materials that may be used to form intermediate layer 26 include, for example, metal (e.g., gold, silver, aluminum, copper, indium, or titanium); metal alloy; metal oxide, glass, or ceramic (e.g., silica, alumina, or zirconia); diamond-like-carbon; metal salt; or the like. Metal salts, such as chlorides, fluorides, sulfates, and carbonates, may be formed through subsequent exposure to acids or gases containing these ions. In some cases, the application of a positive electric charge to the metal layer may be beneficial to attracting the negative ions needed to form a salt. In some examples, intermediate layer 26 may be a multi-layer in itself that includes layers of different inorganic materials.

Intermediate layer 26 may include a layer of an elemental metal and an oxide layer formed through exposure of the elemental metal to the atmosphere or an oxygen-rich gaseous environment. In some examples, as described further below, metal oxides can be used to provide anti-microbial or antibacterial properties to reduce or substantially prevent at least one of undesirable results of microbial contamination such as, for example, unwanted odor, flavor, or discoloration, which can be induced by microbial contamination of the surface, or by a biofilm formed on the surface of article 20.

Any suitable biocompatible metal oxide may be included in intermediate layer 26 including, for example, at least one of silver oxide, zinc oxide, copper oxide, titanium oxide, aluminum oxide, and mixtures and alloys thereof such as an oxide of silver copper zinc alloy (e.g., $AgCuZnO_x$), Ag doped zinc oxide, Ag doped aluminum oxide, Ag doped titanium oxide, and Al doped zinc oxide. In some examples, in addition to metal oxide, intermediate layer 26 may optionally include additional metal compounds such as silver chloride, silver bromide, silver iodide, silver fluoride, copper halide, zinc halide, and combinations thereof. Additional examples regarding the properties of layers incorporating metal oxides are described in U.S. Provisional Patent Application Ser. No. 62/685,773, which is incorporated by reference in its entirety.

In other examples, intermediate layer 26 may include a polymeric hardcoat. As used herein a "polymeric hardcoat" may be used to describe a polymer-based coating layer that has a higher abrasive wear resistance then a layer of parylene of the same thickness. In some examples, the abrasive wear resistance properties may be measured by rubbing a tooth surrogate against the surface of a layer of the respective coating material and assessing the damage to the layer after a simulated two weeks of wear. An intermediate layer 26 that includes a polymeric hardcoat may improve the durability and wear resistant properties of dental article 20 compared to an article that includes a water-resistant coating that includes only a layer including parylene. Additionally, or alternatively, the polymeric hardcoat may improve the abrasion resistance of dental article 20.

Example materials suitable as a polymeric hardcoat may include, for example, cross linkable matrix monomers, oligomers, or polymers with one or more functionalized inorganic fillers. The inorganic fillers may help improve the abrasion resistance of the resultant layer. In some examples, the polymeric hardcoats may be prepared as single component mixtures, multi-component curable formulations, dispersions, and the like. Preferred polymeric hardcoats may be relatively transparent/translucent, smooth, provide strong adherence to first layer 24, be somewhat flexible to minimize cracking during use, stain resistant, have an abrasion resistance greater than parylene, or a combination there of. Example polymeric hardcoats may include 3M 906 Abrasion Resistant Hardcoat available from 3M Corporation, St. Paul, Minn., USA or the hardcoats described in U.S. Patent Publication No. 2015-0132583, which is incorporated by reference in its entirety.

In some examples, the intermediate layer 26 may optionally include dyes or pigments to provide a desired color that may be, for example, decorative or selected to improve the appearance of the teeth of the patient. The dyes or pigments may be added in addition to the inorganic materials or polymeric hardcoats described above. Additionally, or alternatively, first layer 24 or second 28 may be configured to exhibit certain optical properties. For example, first layer 24 or second layer 28 may include Parylene C-UVF®, which includes Parylene-C and a special compound designed to fluoresce under black light.

Intermediate layer 26 may be deposited on first layer 24 using any suitable technique including, for example, chemical vapor deposition, plasma chemical vapor deposition, evaporative deposition, sputtering, atomic layer deposition, electroless plating (e.g., chemical or auto-catalytic plating), electroplating (e.g., after a first conductive layer has been deposited on polymer-based substrate 12), spray coating, dip coating, or the like. In some examples, intermediate layer 26 may define a thickness between about 0.1 µm and about 5 µm.

Figure 3:
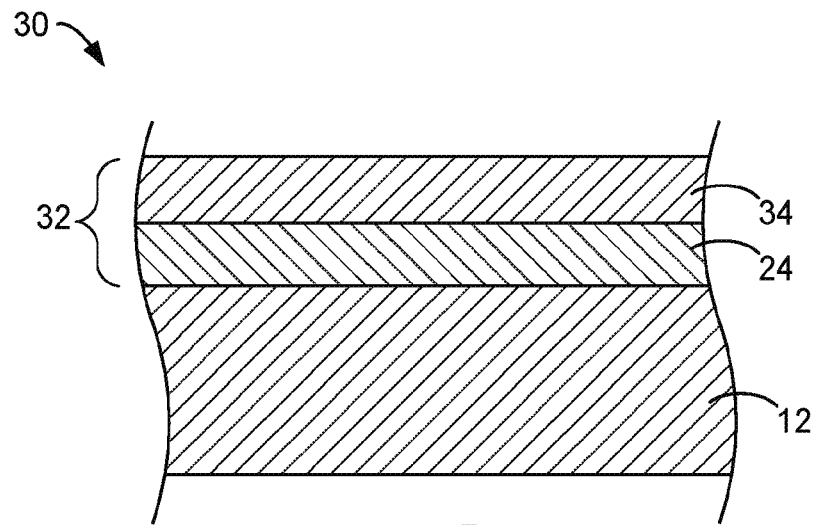

While dental article 20 is illustrated as having first and second layers 24 and 28 each with parylene, in other examples only one of the first or second layers 24 or 28 may be present. For example, FIG. 3 is a schematic cross-sectional view of example dental article 30 that includes polymer-based substrate 12 with a multi-layer water-resistant coating 32 that includes parylene. Multi-layer water resistant coating 32 may include first layer 24 with parylene on polymer-based substrate 12 and an outer layer 34 on first layer 24. Outer layer 34 may include a layer of inorganic material, a layer of a polymeric hardcoat, or a combination thereof (e.g., a layer of a polymeric hardcoat over a layer of inorganic material). In some examples, outer layer 34 may be substantially the same (e.g., the same or nearly the same) as intermediate layer 26 and may include the inorganic material, polymeric hardcoat, and/or layer additives described above with respect to intermediate layer 26.

In some examples, the first layer 24 of multi-layer water resistant coating 32 may help smooth the outer surface of polymer-based substrate 12 and reduce the water vapor transmission rate or the transmission rate of other contaminates through first layer 24. In some examples, outer layer 34 may be relatively thin (e.g., on the order of tens of nanometers) while still providing increased abrasion or wear resistance to dental article 10. Additionally, or alternatively, outer layer 34 may provide a more continuous coating due to the smoothing effect of first layer 26.

In some examples, outer layer 34 may include one or more metal oxides similar to or substantially the same as those described above with respect to intermediate, layer 26. In some examples, metal oxides can be used within outer layer 34 to provide at least one of anti-microbial, antibacterial, or anti-biofilm properties over an extended time period to reduce or substantially prevent at least one of undesirable results of microbial contamination such as, for example, unwanted odor, flavor, or discoloration, which can be induced by microbial contamination of the surface, or by a biofilm formed on the surface of article 30. In some examples, the antimicrobial effect may occur when article 30 is brought into contact with an alcohol or a water-based electrolyte such as a body fluid or body tissue in the mouth of the patient, thus releasing metal Sons such as, for example, Ag+, Al+, atoms, molecules, dusters, or the like. The concentration of the metal which is needed to produce an anti-microbial effect will vary from metal to metal in the metal oxide, in some examples, the described anti-microbial effect may be achieved in body fluids such as saliva at concentrations of less than about 10 ppm. In some examples, the metal oxide within outer layer 34 may exhibit at least a 2-log microbial reduction against S. aureus and S. mutans following 24-hour contact. Log reductions may be measured after testing according to ISO test method ISO 22196:2011, "Measurement of antibacterial activity on plastics and other non-porous surfaces," with appropriate modifications of the test method to accommodate the test materials. Additionally, or alternatively, the metal oxides may prevent calculus build-up on the dental appliance or can include additives to prevent the formation of cavities in the teeth of the patient.

Figure 4:
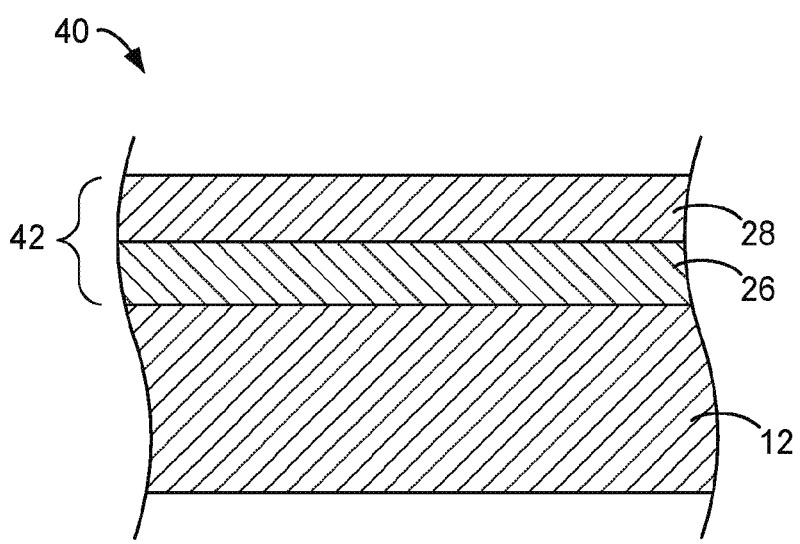

FIG. 4 is a schematic cross-sectional view of an example dental article 40 that includes polymer-based substrate 12 with a multi-layer water-resistant coating 42 that includes parylene. Multi-layer water resistant coating 42 includes intermediate layer 26 on polymer-based substrate 12 and second layer 28 on intermediate layer 26 at the exclusion of first layer 24. In some such examples, the second layer 28 may include parylene and help smooth the outer surface of intermediate layer 26, improve the fracture resistance of intermediate layer 26, or reduce the water vapor transmission rate or the transmission rate of other materials through intermediate layer 26. Both intermediate layer 26 and second layer 28 may include similar components as those described above with respect to FIG. 2.

Figure 5:
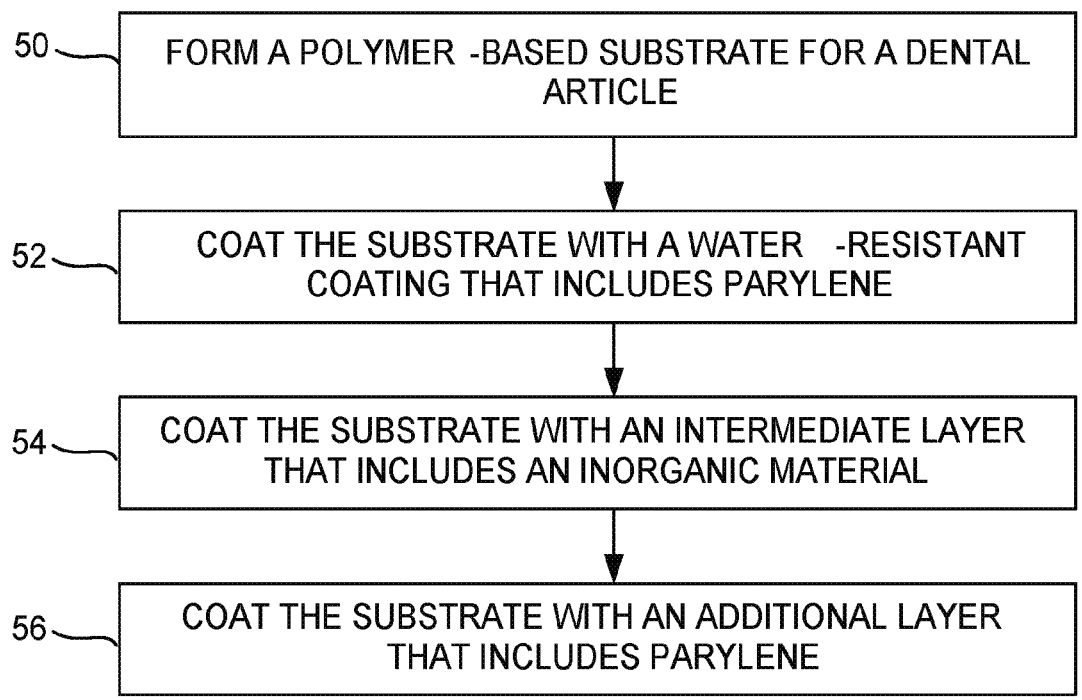
FIG. 5 is a flow diagram illustrating an example technique for forming a dental article that includes a polymer-based substrate and a water-resistant coating that includes parylene.

FIG. 5 is a flow diagram illustrating an example technique for forming dental articles 10, 20, 30, 40 of FIGS. 1-4. The technique of FIG. 5 is described with reference to the various aspects of dental articles 10, 20, 30, 40 for illustrative purposes. However, such descriptions are not intended to be limiting, and the techniques of FIG. 5 may be used with other dental articles or dental articles 10, 20, 30, 40 may be formed using other techniques than those described in FIG. 5.

The technique of FIG. 5 includes forming a polymer-based substrate 12 for a dental article 10 (50) and coating polymer-based substrate 12 with a water-resistant coating 14, 22 that includes parylene (52). As described above, dental article 10 may include dental tray aligners, dental crowns, night guards, retainers, implants, dentures, partials, temporary replacements, elastic bands, springs, spring aligners, polymeric archwires and arch members, custom force members, attachments, brackets and other bonded appliances, trays for delivering therapeutic agents, or the like composed of polymer-based substrate 12.

In some examples, polymer-based substrate 12 may include a polymeric material that defines a modulus of elasticity greater than about 300 MPa. The relatively high modulus of elasticity of polymer-based substrate 12 may permit the dental article 10 to exhibit a sufficient degree of strength and rigidity even where the polymeric material remains relatively thin, which may be particularly suitable for certain dental applications such as dental tray aligners. In some examples, polymer-based substrate 12 may include an acrylate polymer, methacrylate, epoxy, polyester, polyurethane, polycarbonate, silicone or the like. Polymer-based substrate 12 may be a thermoset polymeric material or a thermoplastic polymeric material. Suitable acrylate polymers may include urethane (meth)acrylate polymers. Such urethane acrylate polymers may be particularly useful due to their mechanical properties at body temperature and thermoforming capabilities. As described above, the modulus of elasticity of polymer-based substrate 12 may decrease in the presence of water over time. Water also may accelerate the relaxation of stress exerted by the polymer-based substrate that has been deflected or strained.

Polymer-based substrate 12 may be formed using any suitable technique. In some examples, polymer-based substrate 12 may be formed into the shape of the teeth of a patient using a thermoforming mold process by heating a sheet of the polymeric material used to form polymer-based substrate 12 over a three-dimensional dental mold of the patient and vacuum forming the sheet to the contours of the dental mold. In other examples, polymer-based substrate 12 may be formed via three-dimensional printing based on a digital three-dimensional representation of the teeth of a patient.

In some examples, polymer-based substrate 12 may be further processed prior to coating the substrate with water-resistant coating 14. The additional processing steps may include, for example, trimming and/or removing excess material from the substrate, drilling/cutting holes, channels, slits or the like in the substrate, degassing polymer-based substrate 12 as part of the formation process, drying polymer-based substrate 12 to remove residual moisture, and the like. In some examples, in order to remove residual moisture from polymer-based substrate 12, polymer-based substrate 12 may be placed in a desiccant for a duration of time to draw residual moisture or other materials from polymer-based substrate 12 prior to applying water-resistant coatings 14, 22, 32, or 42. Polymer-based substrate 12 may also be dried at elevated temperatures or vacuum dried at elevated or ambient temperatures to evaporate moisture, other solvents, or other impurities from the substrate.

Additionally, or alternatively, a desiccant (e.g., a moisture getter) may be incorporated directly on or into the polymeric material used to form polymer-based substrate 12. In some examples, polymer-based substrate 12 may be polished or otherwise mechanically manipulated to reduce or eliminate sharp corners or edges or otherwise better conform to the mouth of a patient. Various finishing techniques, such as polishing, may also be performed to improve the clarity and surface finish of the part. Additionally, or alternatively, polymeric based substrate 12 may be treated, e.g., by plasma etching, sandblasting, or abrasive tumbling prior to coating with parylene to enhance adhesion between the two materials.

Polymer-based substrate 12 may be coated with water-resistant coating 14 that includes parylene (52). In some examples, water-resistant coating 14 may include at least one layer composed of parylene which substantially encapsulates polymer-based substrate 12. The layer including parylene may be deposited with a layer thickness of at least 5 µm, at least 15 µm, or at least 25 µm. Various modifications to the parylene coating may be done, for instance by using halogenated monomers and/or incorporating additives to provide additional properties, such as microRESIST from SCS Coatings (Clear Lake, WI). In some examples, the parylene within water-resistant coating 14 may include one or more layers of Parylene-C, Parylene-D, Parylene-F, Parylene HT, SCS microRESIST®, Parylene-N, Parylene C-UVF®, or combinations thereof. In some examples, water-resistant coating 14 may include at least one layer of Parylene-C.

In some examples, water-resistant coating 14 may be deposited on polymer-based substrate 12 using a self-initiated chemical vapor deposition process with para-xylylene dimer as the starting component. For example, polymer-based substrate 12 may be positioned in a vacuum deposition chamber that is evacuated to a pressure on the order of about 0.1 torr. The para-xylylene dimer reactants may be heated to form a monomeric para-xylylene gas which is introduced to the vacuum deposition chamber containing polymer-based substrate 12. The monomeric gas deposits and polymerizes on the surface of polymer-based substrate 12 to substantially encapsulate the substrate with parylene.

Figure 6:
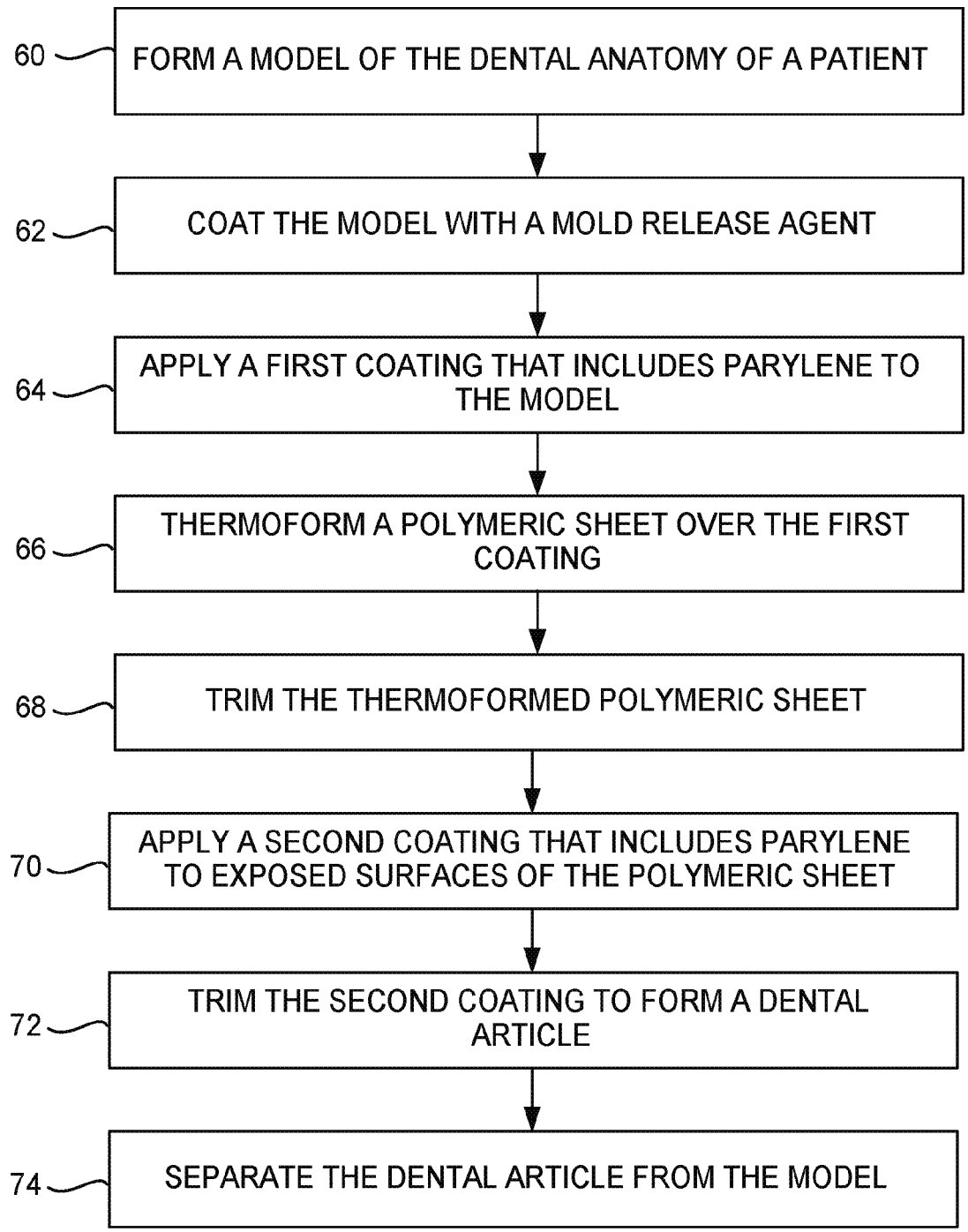
FIG. 6 is an example flow diagram showing a technique for concurrently forming polymer-based substrate and applying a water-resistant coating that includes parylene over the polymer-based substrate.

In some examples, water-resistant coating 14 may be applied after polymer-based substrate 12 has been fully formed. In other examples, water-resistant coating 14 may be formed as part of the construction of polymer-based substrate 12. For example, FIG. 6 is an example flow diagram showing a technique for forming polymer-based substrate 12 and applying water resistant coating 14 over polymer-based substrate 12 in a co-current process. FIG. 6 is described with respect to the article and layers shown in FIGS. 7A-7G for clarity. FIGS. 7A-7G are schematic cross-sectional views of an example layer build process for forming a dental article encapsulated with a water-resistant coating including parylene.

Figure 7A:
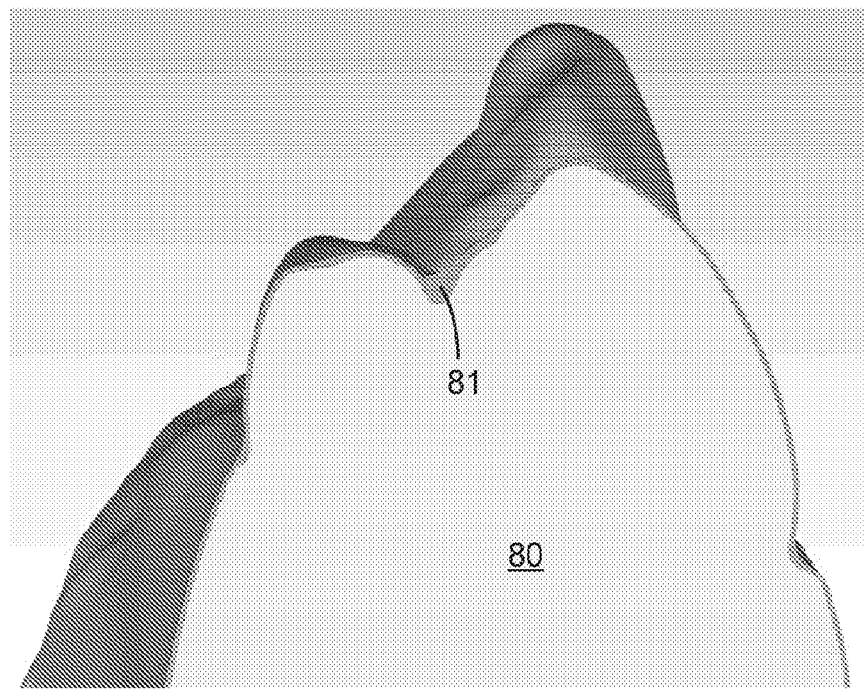
FIGS. 7A-7G are schematic cross-sectional views of an example layer build process for forming a dental article encapsulated with a water-resistant coating including parylene.

The technique of FIG. 6 includes forming a physical model 80 of the dental anatomy of a patient (60) using any suitable technique, and optionally coating model 80 with a mold release agent 81 such as polyvinyl alcohol (62). FIG. 7A shows dental model 80 coated with mold release agent 81.

Figure 7B:
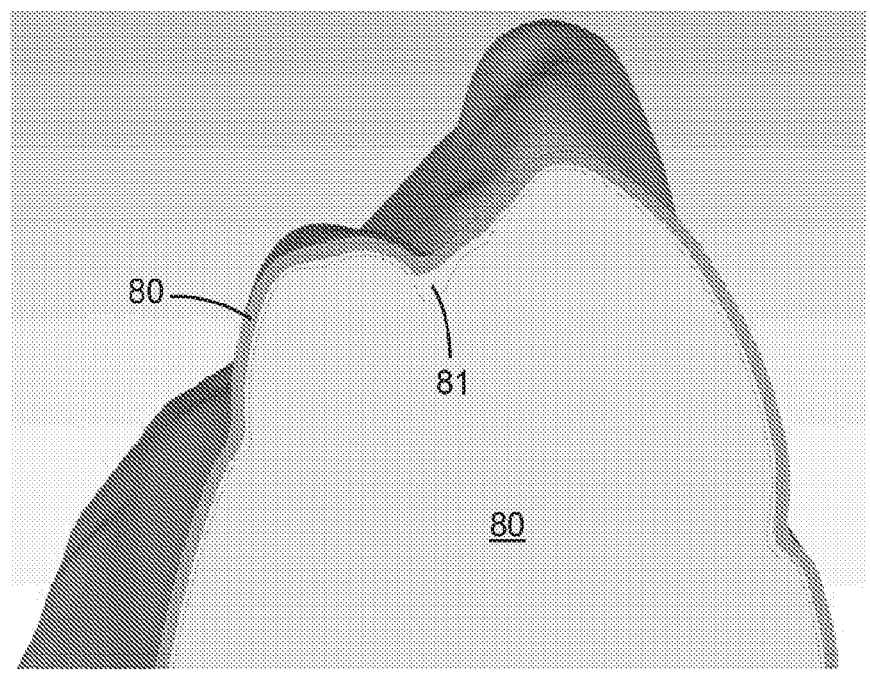
Figure 7C:
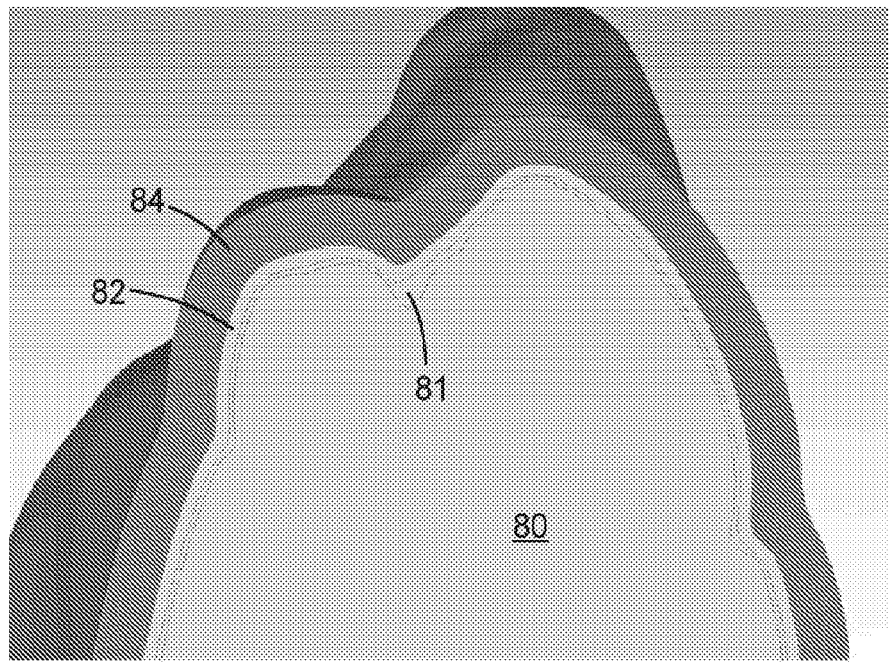

Next, a first coating layer 82 including parylene may be applied (e.g., using CVD) to the model 80 (64) using the techniques described herein. FIG. 7B shows dental model 80 with first coating 82 applied over model 80 and mold release agent 81. Once the first coating 82 is formed, a sheet of the polymeric-based substrate material 84 may be thermoformed over first coating 82 (66) as shown in FIG. 7C. The sheet of polymeric material is formed of the same material used to form polymer-based substrate 12.

Figure 7D:
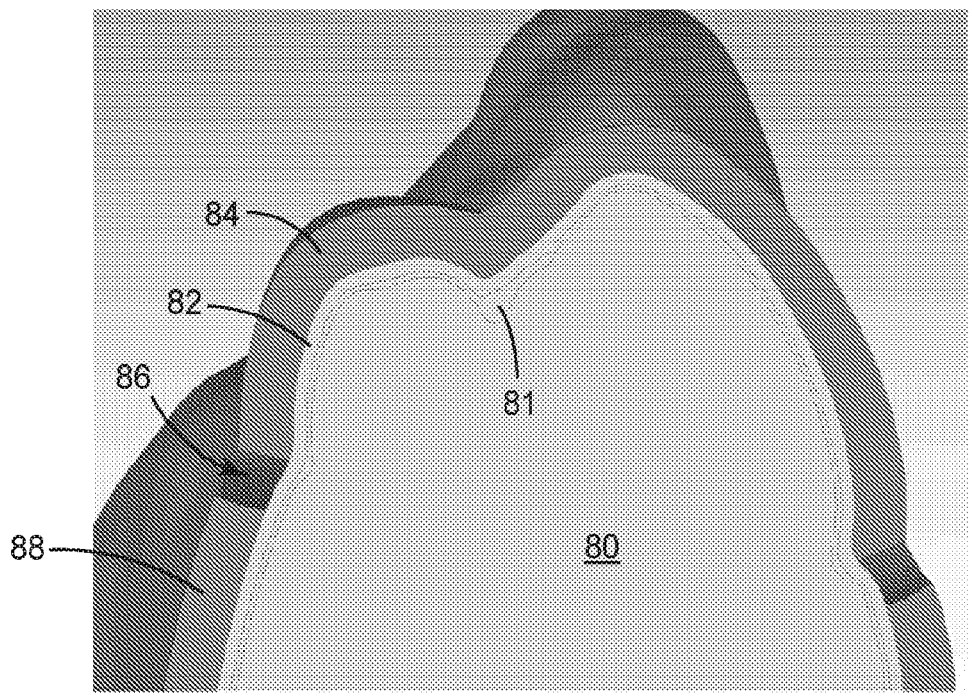

Polymeric sheet 84 may then be trimmed (68) along trim line 86 using, for example, a CNC 5-axis milling or laser cutting tool to the appropriate size. Any excess material 88 of the thermoformed polymeric sheet may be optionally removed. FIG. 7D shows polymeric sheet 84 trimmed to the desired size. At this point in the production, the polymer-based substrate will be formed (e.g., trimmed polymeric sheet 84) with a layer including parylene (e.g., first coating 82) applied to one side of the substrate with both materials still on dental model 80.

Figure 7E:
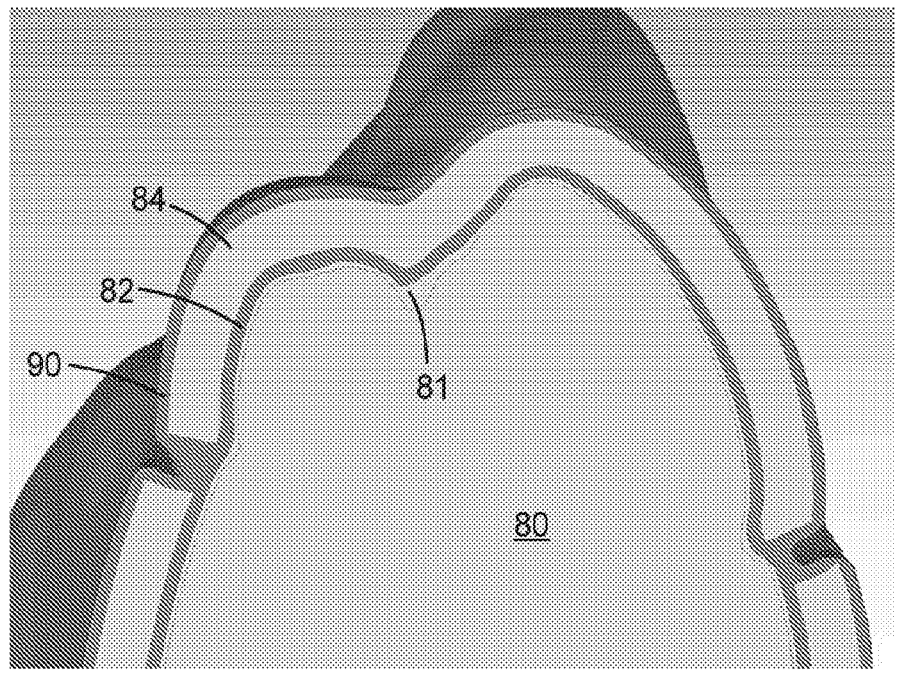
Figure 7F:
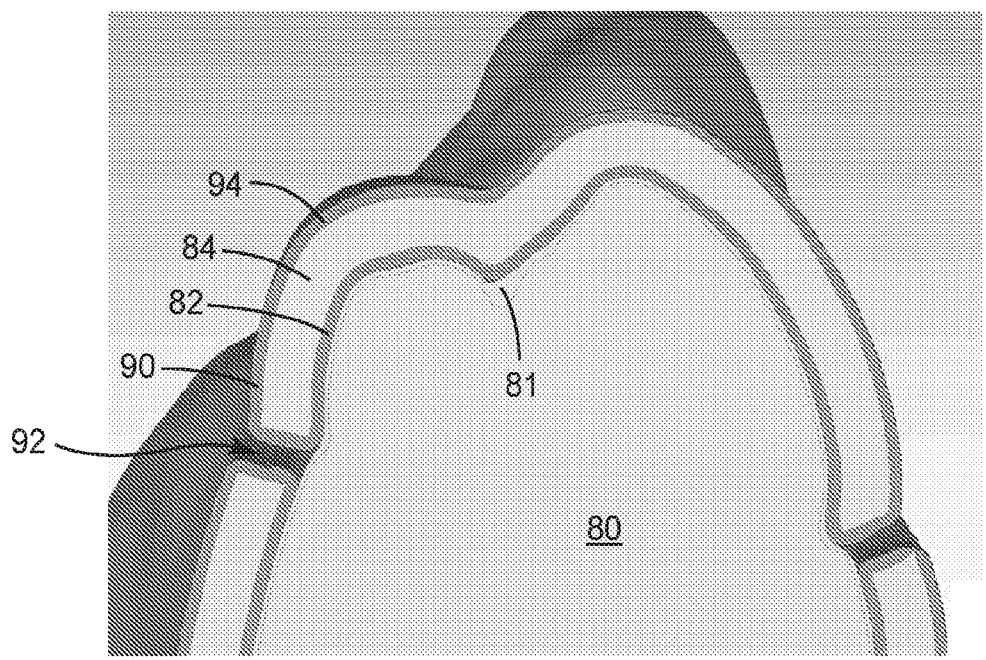
Figure 7G:
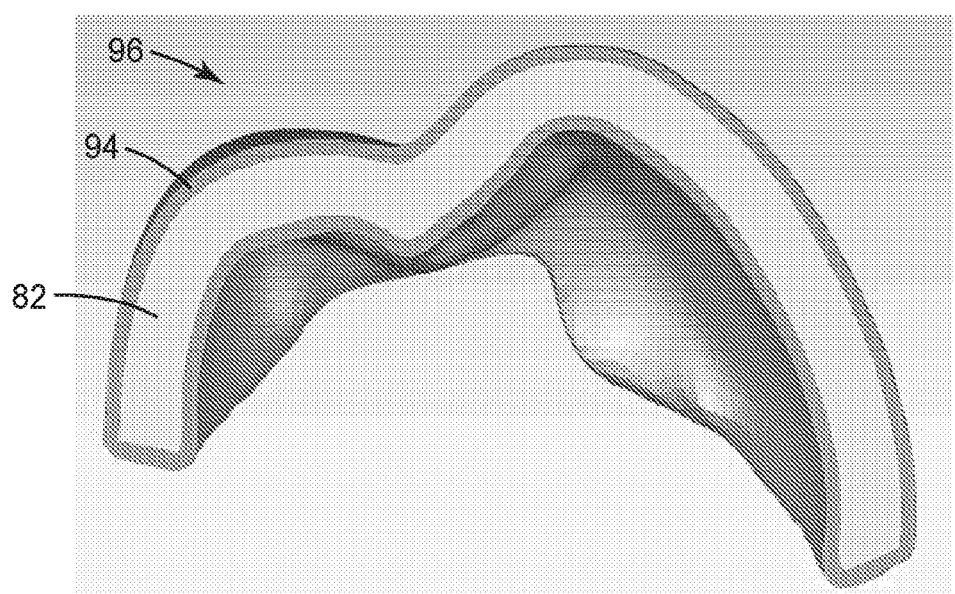

As shown in FIG. 7E, a second coating 90 including parylene may then be applied to the exposed surfaces of the thermoformed and trimmed polymeric sheet 84 (70). Second coating 90 of parylene may merge with first coating 82 to form a continuous layer of parylene encapsulating polymeric sheet 84. Excess portions of second coating 90 and first coating 82 may then be trimmed (72) along trim line 92 as shown in FIG. 7F to define the boundaries of the dental article with the polymer-based substrate (e.g., thermoformed polymeric sheet 84) and a single continuous layer 94 including parylene (e.g., combined first and second coating 82 and 90) formed over the polymer-based substrate. The dental article may then be separated from the dental model (74), for example, by soaking the article and model in warm water to dissolve the mold release agent 81 if present. FIG. 7G illustrates the completed dental article 96 with thermoformed polymeric sheet 84 forming the polymer-based substrate, and encapsulating coating 94 forming the water-resistant layer that includes parylene.

The technique of FIG. 6 may provide some advantages in manufacturing dental article 96. For example, by constructing dental article 96 in the manner described above, coating layer 82 including parylene that is formed on the interior surface of dental article 96 (e.g., the interior surface referring to the portion of the article facing the teeth of a patient) will closely follow or mimic the contours of dental model 80, apart from any differences established by the thickness of mold release agent 81. In some examples, having the exterior surface of coating layer 82 closely follow or mimic the contours of dental model 80 will insure that coating layer 82 on the on the interior surface of dental article 96 does not adversely impact the fit of dental article 96 on the teeth of a patient or intersect the space intended for occupation by the dental anatomy of the patient.

In comparison to an alternative construction, the dental article may be produced by thermoforming a sheet of polymer-based substrate 12 over dental model 80, remove the thermoformed sheet, and subsequently coat the thermoformed sheet with a water-resistant coating 14 that includes parylene on both interior and exterior surfaces of the thermoformed sheet. In such constructions however, the interior surface of the thermoformed sheet will closely follow or mimic the contours of the dental anatomy of the patient. When the subsequent water-resistant coating is then applied to the interior surface, the water-resistant coating may adversely affect the fit of the article by effectively adding to the interior surface of the dental article so that the interior surface no longer closely follows or mimics the dental anatomy of the teeth of a patient. In some examples, the dental model 80 may be oversized in order to anticipate the expected thickness of the applied water-resistant coating 14. For example, dental model 80 may be sized (e.g., virtually offset via computer modeling and three-dimensionally printed) such that the polymeric sheet thermoformed over dental model 80 (e.g., polymer-based substrate 12) is offset from the corresponding contoured surface of the dental anatomy of the patient by the expected or target thickness of water-resistant coating 14. In some examples however, variability in coating thicknesses, particularly with increasing thickness of water-resistant coating 14, may still adversely affect the fitting of the resultant dental article. By forming dental article 96 using the techniques described above with respect to FIG. 6, the interior coating layer 82 will not adversely affect the fit of dental article 96, even where the interior coating layer 82 is relatively thick.

Returning to FIG. 5, once polymer-based substrate 12 is formed (50) and coated with water resistant coating 14 that includes parylene, one or more optional coating layers may be applied to the article. For example, the technique of FIG. 5 also includes optional steps of coating polymer-based substrate 12 with an intermediate layer 26 (54) and coating polymer-based substrate 12 with a second layer 28 that includes parylene (56).

As described above, intermediate layer 26 may be deposited over first parylene layer 24 using any suitable technique including, for example, chemical vapor deposition, evaporative deposition, sputtering, atomic layer deposition, dip coating, spray coating, or the like and may include a polymeric hardcoat as described above or may include any suitable inorganic material such as a metal, a metal alloy, a metal oxide, a ceramic, a glass, a crystalline mineral, or the like. In some examples, intermediate layer 26 may be a clear and continuous film. In examples, where second layer 28 is not included, intermediate layer 26 may form an outer layer (e.g., outer layer 34) of polymer-based substrate 12 and may include one or more layers (e.g., a polymeric hardcoat layer over a layer of inorganic material).

In some examples, the technique of FIG. 5 may also include coating polymer-based substrate 12 with second layer 28 that includes parylene (56) over intermediate layer 26 such that intermediate layer 26 is between the initial water-resistant layer (e.g., first layer 24) and second layer 28. In some such examples, intermediate layer 26 may improve the durability and wear properties of dental article 20 as compared to a water-resistant coating that only included a single layer with parylene (e.g., dental article 10). Such improved wear properties may be useful in certain dental applications such as dental crowns or night guards where chewing or grinding of the teeth are involved.

Second layer 28 that includes parylene may be deposited on polymer-based substrate 12 and any underlying layers using a substantially similar chemical vapor deposition process as that described above with respect to water-resistant coating 14 including a layer of parylene.

EXAMPLES

Example 1—Table 1 provides an example polymeric formulation that may be used to form polymer-based substrate 12. The polymeric formulation shown in Table 1 was mixed in a glass jar and placed on a rolling mixer to produce a homogenous mixture. The mixture was degassed by speed mixing in a planetary mixer at 2000 rpm under vacuum. The mixture was then poured in a silicone dogbone mold (Type V mold, ASTM D638). The filled mold was placed between two glass plates and cured in a broad spectrum UV chamber for approximately 5 minutes. The test samples were demolded and cured for another 5 minutes in the chamber.

TABLE 1

| Example 1 Formulation | Percent by weight (wt. %) of Mixture |
|---|---|
| Urethane (meth)acrylate (Exothane 108, available from Esstech, Inc., PA, USA) | 70 |
| DESMA (Urethane (meth)acrylate)* | 5 |
| Triethylene Glycol Dimethacrylate (Sartomer, PA, USA) | 25 |
| Photo Initiator (Irgacure TPO, available from BASF Corp., NJ, USA) | 0.5 |
| BHT (2,6-Di-tert-butyl-4-methyl-phenol, Fluka Analytical (St. Louis, MO USA) | 0.025 |
| Tinopal OB (BASF Corp, NJ, USA) | 0.025 |

*DESMA as described in U.S. Pat. No. 8,329,776 by Hecht et al., which is incorporated herein by reference in its entirety Some of the polymer substrate test samples were then coated with a layer of parylene via chemical vapor deposition. The select test samples were placed in a vacuum chamber which was evacuated to a pressure of about 0.1 torr. A solid form of para-xylylene dimer was then heated to produce a monomeric para-xylylene gas that was introduced into the vacuum deposition chamber containing the test samples. As monomeric gas contacted the surfaces of the test samples, the gas polymerized to form Parylene C (e.g., poly(para-xylylene) modified by the substitution of a chlorine atom for one of the aromatic hydrogens). The process was continued until a layer thickness of about 25 µm was obtained.

The parylene-coated polymer base substrates (dogbones with Type V geometry according to ASTM D638-10) were then subjected to a water conditioning test and compared to uncoated control samples. The water conditioning tests involved submerging the test samples in phosphate-buffered saline (PBS) solution at 37° C. for 1 to 6 days. The mechanical properties of the test samples were then tested using an Insight Material Testing System available from MTS, MN, USA with 5 kN load cell at a rate of 5 mm/minute to determine the tensile strength, crosshead tensile modulus (based on the crosshead movement as opposed to strain gauges), and crosshead position at break of the samples. The results are reported in Table 2 below.

TABLE 2

|  | Tensile Strength (MPa) | Crosshead position at Break (%) | Modulus based on crosshead movement (MPa) |
|---|---|---|---|
| Uncoated control | 35.7 ± 3.6 | 75.4 ± 17.6 | 281.4 ± 20.1 |
| Uncoated control, 1 day in water submersion | 23.7 ± 2.8 | 100.4 ± 14.3 | 74.37 ± 3.9 |
| Parylene coated - 1 day in water submersion | 36.8 ± 3.3 | 87.2 ± 16.8 | 275.9 ± 13. |
| Parylene coated - 6 days in water submersion | 30 ± 3.2 | 81.7 ± 13.7 | 206.4 ± 9.9 |

Example 2—Test samples of the polymer-based substrate of Example 1 were prepared and some were coated with a water-resistant layer with parylene having a thickness of about 25 μm as described above. Other test samples were coated with alternative and commercially available water-resistant coatings and tested for mechanical properties after submerging the test samples in phosphate-buffered saline (PBS) solution at 37° C. for 24 hours. The test observations are reported in Table 3.

TABLE 3

|  | Mechanical Properties retained after water conditioning test | Adherence to substrate maintained water conditioning test |
|---|---|---|
| Parylene coating (25 μm) | Yes | Yes |
| Commercially available urethane dispersion, U8001, U933, LUX 481, from Alberdingk Boley NC, USA) | No | No |
| Plasma trimethylsilane (TMS) coating | No | Yes |
| Polyvinylidene fluoride (PVDF) coating | No | No |
| Sulfopolyester coating | No | No |
| Polyethylene acrylic acid coating | No | Yes |

Example 3—Test samples of the polymer-based substrate of Example 1 were prepared, and some were coated with a water-resistant layer of a single layer of parylene. The stain resistant properties of the water-resistant layer of parylene were tested in comparison to the non-coated samples. Both test samples were placed in coffee solution at 60° C. overnight. X-Rite Color i7 spectrophotometer available from Grand Rapids, Mich., USA was used to quantify the color parameters (L*, a*, b*) for each of the test samples. The results of the stain test are reflected in Table 4.

TABLE 4

| Sample | Pre-Coffee | | | Post-Coffee (24 hrs. @ 60° C.) | | | Shift | | | |
|---|---|---|---|---|---|---|---|---|---|---|
|  | L* | a* | b* | L* | a* | b* | L* | a* | b* | ΔE |
| Uncoated Control | 91.4 | −5.8 | 11.9 | 77.9 | 4.1 | 50.7 | −13.5 | 9.9 | 38.8 | 42.3 |
| Coated with Parylene | 89.3 | −6.3 | 20.4 | 86.6 | −5.4 | 22.0 | −2.7 | 0.9 | 1.6 | 3.2 |

Clause 1: In one example, a dental article includes a substrate including a polymeric material, wherein a modulus of elasticity of the substrate is reduced upon exposure to water, and a water-resistant coating on the substrate, wherein the water-resistant coating includes parylene.

Clause 2: In some of the examples of the dental article of clause 1, the substrate includes an acrylate polymer.

Clause 3: In some of the examples of the dental article of clause 2, the substrate includes a urethane (meth)acrylate polymer.

Clause 4: In some of the examples of the dental article of clause 1, a modulus of elasticity of the substrate in a substantially dry condition is greater than about 100 MPa.

Clause 5: In some of the examples of the dental article of clause 1, the article includes a dental tray aligner, a dental crown, a night guard, a retainer, a dental implant, a denture, a partial, a temporary dental replacement, an elastic band, a spring, a spring aligner, a polymeric archwire, an arch member, a custom force member, an attachment, a bracket, or a dental tray for delivering therapeutic agent.

Clause 6: In some of the examples of the dental article of clause 5, the article includes the dental tray aligner, the retainer, or the dental crown.

Clause 7: In some of the examples of the dental article of clause 1, the water-resistant coating includes a layer including parylene, wherein the layer including parylene defines a thickness between about 5 micrometers (μm) and about 50 μm.

Clause 8: In some of the examples of the dental article of clause 7, the layer including parylene defines a thickness of at least about 25 μm.

Clause 9: In some of the examples of the dental article of clause 1, wherein the substrate includes a three-dimensionally printed substrate.

Clause 10: In some of the examples of the dental article of clause 1, the water-resistant coating includes a first layer including parylene over the substrate, an intermediate layer over the first layer, the intermediate layer including an inorganic material or a polymeric hardcoat, and a third layer including parylene over the intermediate layer.

Clause 11: In some of the examples of the dental article of clause 10, wherein the inorganic material includes at least one of a metal, a metal alloy, a metal oxide, a metal salt, a ceramic, a glass, or a mineral.

Clause 12: In some of the examples of the dental article of clause 1, the water-resistant coating includes a first layer including parylene over the substrate, and an outer layer over the first layer, the outer layer including an inorganic material or a polymeric hardcoat.

Clause 13: In some of the examples of the dental article of clause 12, the outer layer includes the polymeric hardcoat, the water-resistant coating further includes an intermediate layer between the first layer and the outer layer, and the intermediate layer includes an inorganic material.

Clause 14: In some of the examples of the dental article of clause 1, the water-resistant coating includes an intermediate layer over the substrate, the intermediate layer including an inorganic material or a polymeric hardcoat, and a layer including parylene over the intermediate layer.

Clause 15: In some of the examples of the dental article of clause 1, the water-resistant coating includes a layer including parylene, and wherein the layer including parylene includes a porosity of less than about 5%.

Clause 16: In some of the examples of the dental article of clause 1, the water-resistant coating includes a layer including parylene, and wherein the layer including parylene is vapor-deposited.

Clause 17: In some of the examples of the dental article of clause 1, further including a desiccant.

Clause 18: In some of the examples of the dental article of clause 17, the desiccant includes at least one of silica gel, sodium aluminosilicate, a zeolite, a hydrophilic polymer, or a hydrophilic clay.

Clause 19: In some of the examples of the dental article of clause 17, the desiccant is between the substrate and the water-resistant coating.

Clause 20: In some of the examples of the dental article of clause 17, wherein the desiccant is incorporated in the substrate.

Clause 21: In some of the examples of the dental article of clause 17, the desiccant is contained on or within a discrete area of the substrate.

Clause 22: In some of the examples of the dental article of clause 1, the parylene includes Parylene C.

Clause 23: In some of the examples of the dental article of clause 1, the substrate includes a first surface roughness and the water-resistant coating includes a second surface roughness less than the first surface roughness.

Clause 24: In some of the examples of the dental article of clause 1, wherein the substrate defines a first coefficient of friction and the water-resistant coating defines a second coefficient of friction less than the first coefficient of friction.

Clause 25: In some of the examples of the dental article of clause 1, the water-resistant coating includes a layer including the parylene, wherein the thickness of the layer is greater than the thickness of the substrate.

Clause 26: In some of the examples of the dental article of clause 1, the water-resistant coating does not intersect a space intended for occupation by a dental anatomy of a patient.

Clause 27: In some of the examples of the dental article of clause 26, an interior surface of the substrate is sized so that the substrate is offset from a corresponding surface of the dental anatomy of the patient by an expected thickness of the water-resistant coating.

Clause 28: In some of the examples of the dental article of clause 1, the substrate includes a thermoset polymeric material.

Clause 29: In some of the examples of the dental article of clause 1, the substrate includes a thermoplastic polymeric material.

Clause 30: In one example, a method includes forming a substrate for a dental article, wherein a modulus of elasticity of the substrate is reduced upon exposure to water, and coating the substrate with a water-resistant coating including parylene.

Clause 31: In some of the examples of the method of clause 30, forming the substrate includes forming a dental tray aligner, a dental crown, a night guard, a retainer, a dental implant, a denture, a partial, a temporary dental replacement, an elastic band, a spring, a spring aligner, a polymeric archwire, an arch member, a custom force member, an attachment, a bracket, or a dental tray for delivering therapeutic agent.

Clause 32: In some of the examples of the method of clause 30, a modulus of elasticity of the substrate in a substantially dry condition is greater than about 100 MPa.

Clause 33: In some of the examples of the method of clause 30, forming the substrate includes three-dimensional printing the substrate.

Clause 34: In some of the examples of the method of clause 33, a surface of the water-resistant coating facing a portion of a dental anatomy of a patient does not intersect a space intended for occupation by the corresponding dental anatomy of a patient.

Clause 35: In some of the examples of the method of clause 33, the substrate is sized so that a surface of the substrate facing a dental anatomy of a patient is offset from a corresponding surface of the dental anatomy of the patient by an expected thickness of the water-resistant coating.

Clause 36: In some of the examples of the method of clause 30, wherein forming the substrate includes thermoforming the substrate over a three-dimensional model of a dental anatomy of a patient.

Clause 37: In some of the examples of the method of clause 36, wherein the three-dimensional model of the dental anatomy of the patient is sized so that a surface of the substrate facing the three-dimensional model is offset from a corresponding surface of the dental anatomy of the patient by an expected thickness of the water-resistant coating.

Clause 38: In some of the examples of the method of clause 36, a surface of the water-resistant coating facing a portion of the dental anatomy does not intersect a space intended for occupation by a corresponding dental anatomy of a patient.

Clause 39: In some of the examples of the method of clause 30, wherein coating the substrate with the water-resistant coating includes chemical vapor depositing a layer including parylene over the substrate.

Clause 40: In some of the examples of the method of clause 30, wherein coating the substrate with the water-resistant coating includes depositing a layer including parylene having a thickness between about 5 micrometers (μm) and about 50 μm over the substrate.

Clause 41: In some of the examples of the method of clause 30, the thickness of the layer including parylene is at least about 25 μm.

Clause 42: In some of the examples of the method of clause 30, wherein coating the substrate with the water-resistant coating includes chemical vapor depositing a first layer including parylene over the substrate, and depositing an intermediate layer including an inorganic material or a polymeric hardcoat over the first parylene layer.

Clause 43: In some of the examples of the method of clause 42, further including chemical vapor depositing a second layer including parylene over the intermediate layer.

Clause 44: In some of the examples of the method of clause 42, the inorganic material includes at least one of a metal, a metal alloy, a metal oxide, a metal salt, a ceramic, a glass, or a mineral.

Clause 45: In some of the examples of the method of clause 30, forming the substrate includes incorporating a desiccant on a surface of the substrate or within the substrate.

Clause 46: In one example, a dental article includes a three-dimensionally printed polymeric substrate, and a water-resistant coating applied over the substrate, wherein the water-resistant coating includes a parylene layer.

Clause 47: In some of the examples of the dental article of clause 46, three-dimensionally printed polymeric substrate defines a modulus of elasticity greater than about 100 MPa.

Clause 48: In some of the examples of the dental article of clause 46, the three-dimensionally printed polymeric substrate includes a urethane-based polymeric substrate selected from the list consisting of (meth)acrylate polymers, epoxies, urethanes, polyesters, polycarbonates, and silicones.

Clause 49: In some of the examples of the dental article of clause 46, the article includes a dental tray aligner for aligning teeth of a patient, a retainer, or a dental crown.

Clause 50: In some of the examples of the dental article of clause 46, the water-resistant coating includes a first layer including parylene over the substrate, an inorganic layer including an inorganic material over the first layer, and a third layer including parylene over the inorganic layer.

Clause 51: In some of the examples of the dental article of clause 50, the inorganic material includes at least one of a metal, a metal alloy, a metal oxide, a metal salt, a ceramic, a glass, or a mineral.

Clause 52: In some of the examples of the dental article of clause 46, further including a desiccant.

Clause 53: In some of the examples of the dental article of clause 46, wherein the desiccant is between the three-dimensionally printed polymeric substrate and the water-resistant coating.

Clause 54: In some of the examples of the dental article of clause 46, the desiccant is incorporated in the three-dimensionally printed polymeric substrate.

Clause 55: In some of the examples of the dental article of clause 46, the three-dimensionally printed polymeric substrate includes a surface defining a plurality of contour lines that produce an aliasing effect.

Clause 56: In some of the examples of the dental article of clause 55, wherein the water-resistant coating reduces the aliasing effect of the three-dimensionally printed polymeric substrate.

Clause 57: In some of the examples of the dental article of clause 46, the three-dimensionally printed polymeric substrate includes a first plurality of surface textures having a texture size less than about 20 µm.

Clause 58: In some of the examples of the dental article of clause 57, the water-resistant coating includes a second plurality of surface textures having a texture size less than the size of the first plurality of surface textures.

Clause 59: In some of the examples of the dental article of clause 46, wherein the three-dimensionally printed polymeric substrate includes a first surface roughness and the water-resistant coating includes a second surface roughness less than the first surface roughness.

Clause 60: In some of the examples of the dental article of clause 46, the three-dimensionally printed polymeric substrate defines a first coefficient of friction and the water-resistant coating defines a second coefficient of friction less than the first coefficient of friction.

Clause 61: In some of the examples of the dental article of clause 46, wherein a surface of the water-resistant coating facing a portion of the dental anatomy does not intersect a space intended for occupation by a corresponding dental anatomy of a patient.

Clause 62: In one example, a method includes forming a model of dental anatomy of a patient, applying a first coating including parylene on the model, thermoforming a sheet of polymeric material over the first coating, trimming the sheet of polymeric material to form a polymer-based substrate, applying a second coating including parylene on exposed surfaces of the polymer-based substrate, trimming the first coating and the second coating to define a dental article, the dental article including the polymer-based substrate, the first coating, and the second coating, and separating the dental article from the model.

Clause 63: In some of the examples of the method of clause 62, the method further includes coating the model with a mold release agent prior to applying a first coating including parylene on the model.

Clause 64: In some of the examples of the method of clause 63, the method further includes dissolving the mold release agent prior to separating the dental article from the model.

Clause 65: In some of the examples of the method of clause 62, a modulus of elasticity of the polymer-based substrate in a substantially dry condition is greater than about 100 MPa.

Various examples have been described. These and other examples are within the scope of the following claims.

What is claimed is:

1. A dental article comprising:
   a polymeric substrate;
   a first water-resistant coating comprising parylene, wherein the first water-resistant coating is in contact with the polymeric substrate; and
   an additional layer comprising an inorganic material, a polymeric hardcoat, or a combination thereof, wherein the additional layer is in contact with the first water-resistant coating; and
   a second water-resistant coating comprising parylene, wherein the second water-resistant coating is in contact with the additional layer comprising an inorganic material, a polymeric hardcoat, or a combination thereof.

2. The dental article of claim 1, wherein the polymeric substrate comprises at least one of an acrylate polymer, a thermoset polymer, or a thermoplastic polymer, and wherein a modulus of elasticity of the polymeric substrate in a substantially dry condition is greater than about 100 MPa.

3. The dental article of claim 1, being a dental tray aligner, a dental crown, a night guard, a retainer, a dental implant, a denture, a partial, a temporary dental replacement, an elastic band, a spring, a spring aligner, a polymeric archwire, an arch member, a custom force member, an attachment, a bracket, or a dental tray for delivering therapeutic agent.

4. The dental article of claim 1, wherein the inorganic material comprises a metal, a metal alloy, a metal oxide, a metal salt, a ceramic, a glass, a mineral, or a combination thereof.

5. The dental article of claim 1, further comprising a desiccant, wherein the desiccant is between the polymeric substrate and the water-resistant coating or incorporated within the polymeric substrate.

6. The dental article of claim 1, wherein the polymeric substrate comprises a three-dimensionally printed polymeric substrate comprising a surface defining a plurality of contour lines that produce an aliasing effect, and wherein the water-resistant coating reduces the aliasing effect of the polymeric substrate.

7. A method of preparing a dental article of claim 1, the method comprising:
providing a polymeric substrate, the polymeric substrate;
contacting the polymeric substrate with a first water-resistant coating, the first water-resistant coating comprising parylene;
contacting the first water-resistant coating with an additional layer, the additional layer comprising an inorganic material, a polymeric hardcoat, or a combination thereof; and
contacting the additional layer with a second water resistant coating comprising parylene.

8. The method of claim 7, wherein the forming of the polymeric substrate is in the shape of a dental tray aligner, a dental crown, a night guard, a retainer, a dental implant, a denture, a partial, a temporary dental replacement, an elastic band, a spring, a spring aligner, a polymeric archwire, an arch member, a custom force member, an attachment, a bracket, or a dental tray for delivering therapeutic agent.

9. The method of claim 7, further comprising forming the polymeric substrate, wherein the forming of the polymeric substrate comprises three-dimensional printing.

10. The method of claim 9, wherein the forming of the polymeric substrate and the contacting of the polymeric substrate with the first water-resistant coating comprise:
coating a model of dental anatomy of a patient with the first water-resistant coating comprising parylene;
thermoforming a sheet of polymeric material over the first water-resistant coating;
trimming the sheet of polymeric material to form the polymeric substrate; and
separating the polymeric substrate from the model.

11. The method of claim 10, further comprising contacting any exposed surfaces on the polymeric substrate with the first water-resistant coating.

12. The method of claim 7, wherein the contacting of the polymeric substrate with the first water-resistant coating comprises chemical vapor depositing.

13. The method of claim 7, wherein the contacting of the additional layer with the second water-resistant coating comprising parylene is via chemical vapor depositing.

14. The method of claim 7, wherein the inorganic material comprises a metal, a metal alloy, a metal oxide, a metal salt, a ceramic, a glass, a mineral, or a combination thereof.

15. A dental article comprising:
a three-dimensionally printed polymeric substrate;
a first water-resistant coating comprising parylene, wherein the first water-resistant coating is in contact with the three-dimensionally printed polymeric substrate;
an additional layer comprising an inorganic material, a polymeric hardcoat, or a combination thereof, wherein the additional layer is in contact with the first water-resistant coating; and
a second water-resistant coating comprising parylene, wherein the second water-resistant coating comprising parylene.

16. The dental article of claim 15, wherein the three-dimensionally printed polymeric substrate comprises a surface defining a plurality of contour lines that produce an aliasing effect, and wherein the first water-resistant coating reduces the aliasing effect of the three-dimensionally printed polymeric substrate.

17. The dental article of claim 15,
wherein the additional layer comprises an inorganic material.

* * * * *